No. 837,374. PATENTED DEC. 4, 1906.
F. ARONSON.
BALANCE.
APPLICATION FILED MAR. 23, 1906.
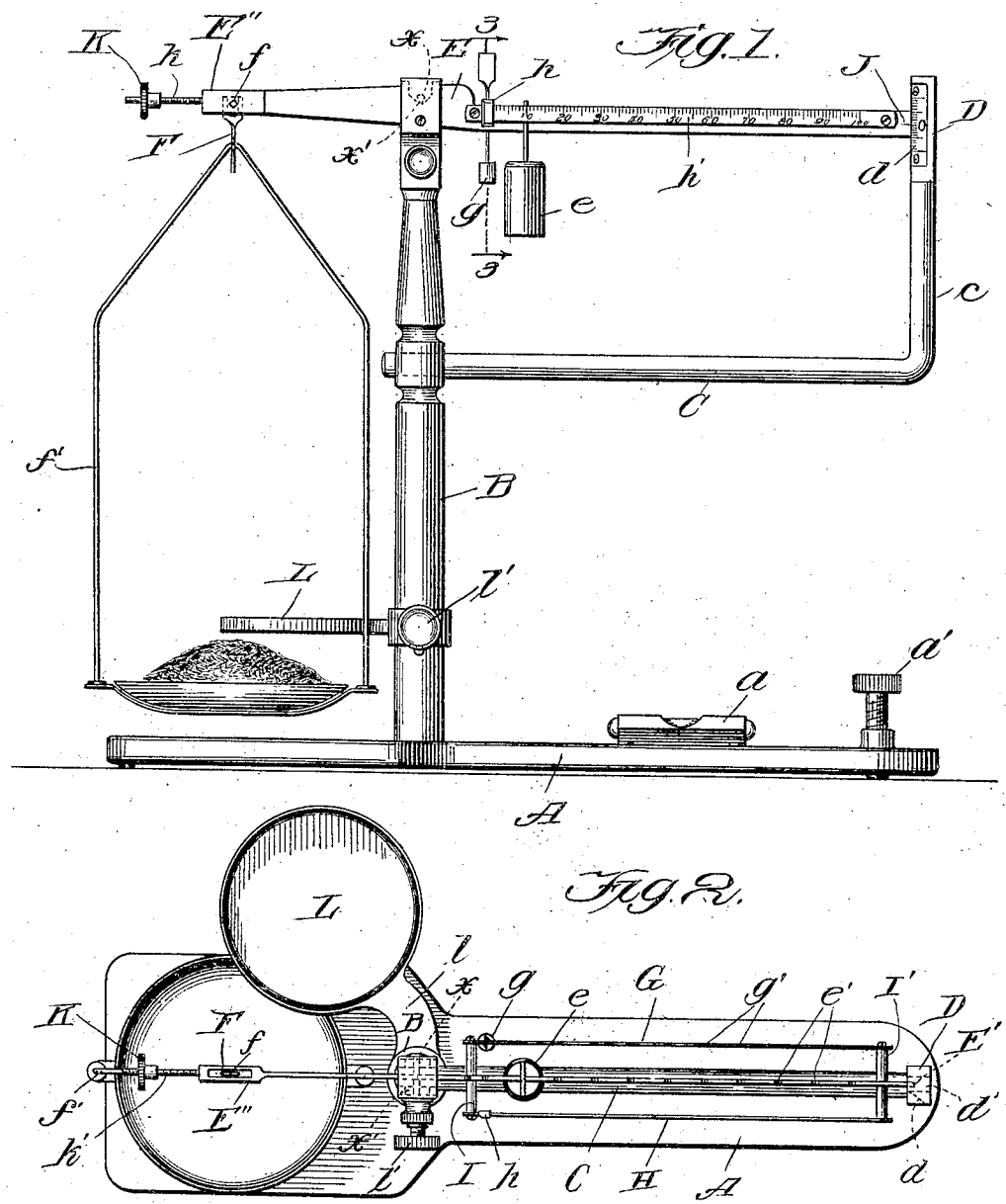

UNITED STATES PATENT OFFICE.

FRANK ARONSON, OF EVANSTON, ILLINOIS.

BALANCE.

No. 837,374.　　　Specification of Letters Patent.　　　Patented Dec. 4, 1906.

Application filed March 23, 1906. Serial No. 307,593.

*To all whom it may concern:*

Be it known that I, FRANK ARONSON, a citizen of the United States, residing at Evanston, in the county of Cook and State of Illinois, have invented new and useful Improvements in Balances, of which the following is a specification.

The primary object of this invention is to provide a laboratory-balance of simple and inexpensive construction adapted to weigh accurately and having a considerable degree of sensibility.

Further objects of the invention are to provide a single fulcrum for a plurality of beams arranged in a horizontal plane; to suspend the weights permanently from the beams so that they can be easily manipulated without interfering with each other, and to arrange the beams and weights in a convenient manner, so that the aggregate weight may be easily read.

In the accompanying drawings, Figure 1 is an elevation showing the invention. Fig. 2 is a top plan view. Fig. 3 is a sectional view on the line 3 3 of Fig. 1.

Referring to the drawings, A designates a base of suitable character provided with a spirit-level $a$ and an adjusting-screw $a'$. A standard B is mounted on the base, and an arm C is secured in a suitable manner to the standard. This arm projects laterally from the standard, and its outer end $c$ is bent upward and carries a slotted guide D, provided with an indicator-scale $d$. A main beam E is fulcrumed on knife-edges $x$, working in bearings $x'$ at the upper end of the standard, and one end $E'$ of this beam projects into the slot $d'$ of the guide D. A hook F is fulcrumed on knife-edges $f$ at the other end $E''$ of the main beam to receive a pan-hanger $f'$. Supplemental beams G H are mounted on cross-bars I I', carried by the main beam, and the three beams E G H are located side by side with their upper edges in the same plane. Weights $e\ g\ h$ are hung on the beams, and they are preferably graduated, as shown in the drawings, the weight $e$ being the heaviest and the weight $h$ the lightest. The beams E and G are provided between the cross-bars I I' with notches $e'$ and $g'$, and the beam H is provided between said cross-bars with a scale $h'$. In the adaptation of the invention illustrated in the drawings the weight $e$ is proportioned and the notches on the beam E are disposed to determine weight in multiples of ten grams, the weight $g$ is proportioned and the notches on the beam G are disposed to determine weight in multiples of one gram, and the weight $h$ is proportioned and the scale $h'$ is graduated to determine weight in multiples of one-tenth of a gram. The main beam is perfectly balanced when the line J is opposite the zero-mark on the indicator-scale $d$, and this balancing is effected initially by adjusting the weight K on the threaded stem $k'$, projecting from the end $E''$ of the main beam. The table L is carried by an arm $l$, which is adjustably secured on the standard by a thumb-screw $l'$. In specific-gravity work when substances are first weighed in water this table is adjusted to proper position to support the beaker containing the water.

The invention is comparatively simple in construction, and it can be made up largely from stock material in an inexpensive manner. At the same time it will weigh accurately and has a considerable degree of sensibility, and this result is due largely to the arrangement of the three beams side by side in the same plane, so that when the beams are balanced their upper edges, from which the weights are suspended, will lie in a horizontal plane coincident with the fulcrum of the main beam and the fulcrum of the pan-hanger hook. The beams are spaced apart, so that the weights can be easily manipulated without interfering with each other, and the beam carrying the smallest weight is located on the side of the balance at which the operator would naturally stand, so that it can be read quickly, and the total weight can be easily determined by adding together the weights indicated by the position of the weights on the three beams. The weights are permanently located on the beams, because they are arranged thereon between the cross-bars, which prevent their removal from the beams.

What I claim, and desire to secure by Letters Patent, is—

1. A laboratory-balance comprising a base, a standard mounted on the base, a main beam fulcrumed on the standard, a hook fulcrumed at one end of the main beam to carry a pan-hanger, an indicator-scale adjacent to the other end of the main beam, a pair of cross-bars carried by the main beam between the fulcrum of the main beam and the indicator-scale, one of said cross-bars being located adjacent to the fulcrum of the main beam and the other adjacent to said indicator-scale, a pair of supplemental beams carried by said cross-bars parallel with the main beam and one on each side thereof, the upper edge of all of said beams lying in a plane coincident with the fulcrum of the main beam and the fulcrum of said hook, and independent weights movable on said beams.

2. A laboratory-balance comprising a base, a standard mounted on the base, a main beam fulcrumed on the standard, a hook fulcrumed at one end of the main beam to carry a pan-hanger, an indicator-scale adjacent to the other end of the main beam, a pair of cross-bars carried by the main beam between the fulcrum of the main beam and the indicator-scale, one of said cross-bars being located adjacent to the fulcrum of the main beam and the other adjacent to said indicator-scale, a pair of supplemental beams carried by said cross-bars parallel with the main beam and one on each side thereof, the upper edge of all of said beams lying in a plane coincident with the fulcrum of the main beam and the fulcrum of said hook, the upper edge of the main beam and the upper edge of one supplemental beam having notches therein disposed at regular intervals, the other supplemental beam having on its outer side a finely-graduated scale marked thereon, and independent weights of graduated weight carried by said beams, the weight on the main beam being heaviest and the weight on the scale-beam being lightest.

3. A laboratory-balance comprising a base, a standard mounted on the base, a main beam fulcrumed on the standard, a pan suspended from said beam at one end thereof, an arm on the standard extending outwardly therefrom and bent upward parallel with the standard, an indicator-scale carried by the arm adjacent to the other end of the main beam, a pair of supplemental beams carried by the main beam, one on each side thereof, between the fulcrum of the main beam and said indicator-scale, independent weights movable on said beams, and a table adjustably secured on the standard below the arm.

FRANK ARONSON.

Witnesses:
A. W. McCONNELL,
J. M. ROBERTS.